United States Patent
Groh

(10) Patent No.: US 11,780,375 B2
(45) Date of Patent: Oct. 10, 2023

(54) TRIM ELEMENT HAVING A RECEPTACLE FOR A WARNING TRIANGLE, TAILGATE HAVING A TRIM ELEMENT, AND MOTOR VEHICLE HAVING SUCH A TAILGATE

(71) Applicant: AUDI AG, Ingolstadt (DE)

(72) Inventor: Richard Philipp Groh, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 402 days.

(21) Appl. No.: 16/973,532

(22) PCT Filed: May 21, 2019

(86) PCT No.: PCT/EP2019/063021
§ 371 (c)(1),
(2) Date: Dec. 9, 2020

(87) PCT Pub. No.: WO2020/007527
PCT Pub. Date: Jan. 9, 2020

(65) Prior Publication Data
US 2021/0253032 A1 Aug. 19, 2021

(30) Foreign Application Priority Data
Jul. 4, 2018 (DE) .................. 10 2018 210 988.5

(51) Int. Cl.
*B60R 7/08* (2006.01)
*B60Q 7/00* (2006.01)
(Continued)

(52) U.S. Cl.
CPC .................. *B60R 7/08* (2013.01); *B60Q 7/00* (2013.01); *B60R 13/02* (2013.01); *G09F 13/16* (2013.01)

(58) Field of Classification Search
CPC .......... B60R 7/08; B60R 11/00; B60R 11/06; B60R 13/02; B60R 2011/0036; B60R 2013/016; B60Q 7/00; G09F 13/16
See application file for complete search history.

(56) References Cited

U.S. PATENT DOCUMENTS

2012/0262933 A1* 10/2012 Larsson ................. B60Q 1/304
362/496
2016/0375841 A1* 12/2016 Schaefer ............... B60R 13/011
296/37.1

FOREIGN PATENT DOCUMENTS

CN 105938695 A 9/2016
CN 205836658 U 12/2016
(Continued)

OTHER PUBLICATIONS

Notification of Transmittal of Translation of the International Preliminary Report on Patentability dated Jan. 14, 2021, in connection with corresponding International Application No. PCT/EP2019/063021; 8 pages.
(Continued)

*Primary Examiner* — Lori Lyjak
(74) *Attorney, Agent, or Firm* — Maier & Maier, PLLC

(57) ABSTRACT

A trim element for a tailgate of a motor vehicle. A receptacle is formed in the trim element which is open towards an inside of the vehicle and in which a warning triangle received in a case can be placed or is placed. The receptacle has: a rear wall portion having at least one elastic clamping element; two front restraining portions; a support portion; and the clamping element, the front restraining portions and the support portion are designed in such a way that they are in a form-fitting and/or force-fitting connection with the case when the warning triangle is placed. The rear wall portion has a guide portion above the clamping element which is curved concavely towards the inside of the vehicle and along (Continued)

which the case of the warning triangle can be introduced into or removed from the receptacle.

16 Claims, 4 Drawing Sheets

(51) Int. Cl.
*B60R 13/02* (2006.01)
*G09F 13/16* (2006.01)

(56) References Cited

FOREIGN PATENT DOCUMENTS

| CN | 106274717 | A | | 1/2017 | | |
|---|---|---|---|---|---|---|
| CN | 206124911 | U | | 4/2017 | | |
| DE | 19856314 | A1 | * | 6/2000 | .......... | B60R 11/0211 |
| DE | 19901511 | A1 | * | 7/2000 | ................ | B60N 2/44 |
| DE | 10052230 | B4 | * | 12/2010 | ............. | B60R 11/00 |
| DE | 102014207362 | A1 | | 10/2015 | | |
| DE | 102015008134 | A1 | | 12/2016 | | |
| DE | 202015008710 | U1 | | 3/2017 | | |
| DE | 102016225658 | A1 | * | 6/2018 | ............. | B60R 11/00 |
| DE | 102016225658 | A1 | | 6/2018 | | |
| WO | WO-2018114146 | A1 | * | 6/2018 | ............. | B60R 11/00 |
| WO | WO-2019020386 | A1 | * | 1/2019 | ............. | B60R 11/00 |

OTHER PUBLICATIONS

German Examination Report dated Apr. 16, 2019 in corresponding German Application No. 10 2018 210 988.5; 16 pages; Machine translation attached.

International Search Report (with English translation) and Written Opinion (with Machine translation) dated Jul. 12, 2019 in corresponding International Application No. PCT/EP2019/063021; 12 pages.

Office Action dated Jun. 1, 2023, in corresponding Chinese Application No. 201980044922.3, 16 pages.

* cited by examiner

TRIM ELEMENT HAVING A RECEPTACLE FOR A WARNING TRIANGLE, TAILGATE HAVING A TRIM ELEMENT, AND MOTOR VEHICLE HAVING SUCH A TAILGATE

FIELD

The invention relates to a trim element for a tailgate of a motor vehicle, wherein a receptacle is formed in the trim element which is open towards the inside of the vehicle and in which a warning triangle received in a case can be placed or is placed. The invention also relates to a tailgate having such a trim element and a motor vehicle having such a tailgate.

BACKGROUND

The receptacle has the following elements:
a rear wall portion having at least one elastic clamping element; two front restraining portions; and
a support portion, wherein the clamping element, the front restraining portions and the support portion are designed in such a way that they are in a form-fitting and/or force-fitting connection with the case when the warning triangle is placed.

Providing a receptacle for a warning triangle in a tailgate is known for example from DE 20 2015 008 710 U1. The receptacle described therein has two front restraining portions that are inclined towards the inside of the vehicle. This inclined configuration is needed so that the case of the warning triangle being clamped by means of two leaf springs which are formed in the rear wall portion can be tilted forwards to release engagement with the leaf springs. Furthermore, the leaf springs protrude relatively far towards the direction of the interior of the vehicle so that the inclined arrangement of the front restraining portion provides space to enable removal of the case past the leaf springs and upwards out of the receptacle.

It should be noted that such receptacles for the warning triangle usually do not allow for the warning triangle and/or its case to be removed when the tailgate is closed, unless one would reach over the rear seat bench towards the closed tailgate to remove the warning triangle from the receptacle. Rather, the warning triangle is removed from its receptacle when the tailgate is open, with the inner trim of the tailgate with the receptacle provided therein then being arranged above the head of a person, in particular being oriented essentially horizontally.

In a receptacle known from DE 20 2015 008 710 U1 a force must be applied to an upper edge of the case that is very close to the tailgate trim when removing the warning triangle, with the force having to be applied centrally between the two leaf springs. This is usually done by the person who carries out the task inserting several fingers of one or both hands into the narrow gap between the case and the trim element. Removal is therefore rather difficult and poses the risk of injuring the fingertips, especially the fingernails. Furthermore, the front restraining portions that are inclined in the direction of the vehicle interior require installation space and have a detrimental effect on the cargo volume available in the trunk.

SUMMARY

Therefore, the object of this invention is to provide for an improved, space-saving receptacle for a warning triangle in which the warning triangle is held securely and from which it can be easily removed.

This object is achieved by a trim element and by a motor vehicle.

Thus, a trim element for a tailgate of a motor vehicle is proposed, wherein a receptacle is formed in the trim element which is open towards the inside of the vehicle and in which a warning triangle received in a case can be placed or is placed, wherein the receptacle has: a rear wall portion having at least one elastic clamping element; two front restraining portions; and a support portion; wherein the clamping element, the front restraining portions, and the support portion are designed in such a way that they are in a form-fitting and/or force-fitting connection with the case when the warning triangle is placed. According to the invention, the rear wall portion has a guide portion above the clamping element which is curved concavely towards the inside of the vehicle and along which the case of the warning triangle can be introduced into or removed from the receptacle.

The guide portion forms an essentially continuous transition between the receptacle and the rest of the trim element, such that the case of the warning triangle can be removed from the receptacle along the guide portion easily and in a guided manner.

The receptacle may have two lateral centering elements, each of which has an introduction portion inclined relative to a vertical direction and a receiving portion adjoining the introduction portion and extending essentially in the vertical direction. The two introduction portions may be designed in such a way that they form a V-shaped, in particular funnel-like, lateral guide for the case.

The case of the warning triangle is laterally retained in a form-fitting and/or force-fitting manner between the lateral receiving portions. If the warning triangle is removed from the receptacle, lateral contact with the receiving portions is eliminated and the warning triangle is laterally movable between the inclined introduction portions, such that it can be removed more easily. Conversely, the inclined introduction portions guide the case towards its laterally centered position between the two receiving portions when the warning triangle and/or its case is to be introduced into the receptacle.

The support portion may have two lateral sub-portions spaced apart from each other. The distance created between the two sub-portions can be designed in such a way that the rear wall portion forms a recessed grip between the two sub-portions. In particular, the distance between the two sub-portions is selected to be large and/or wide enough that a hand can grasp the case in the region of the recessed grip and move it towards the guide portion of the rear wall portion. Providing such a recessed grip simplifies removal of the warning triangle and/or its case and reduces the risk of injury to fingers and/or fingernails.

The clamping element can be integrally formed with the rear wall portion, wherein transition regions with reduced material thickness are arranged between the clamping element and the rear wall portion, such that the clamping element is movable relative to the rear wall portion deforming the transition portions. This configuration of the clamping element enables the warning triangle to be removed from or introduced into the receptacle along the rear wall portion without tilting it, wherein the clamping element is temporarily pressed towards the rear wall portion by the case, taking advantage of the deformation of the transition region with reduced material thickness.

The receptacle can be provided with two clamping elements. Each clamping element can be arranged above one of the two sub-portions. This means that the clamping elements are arranged laterally relative to the recessed grip, which further simplifies removal and/or introduction of the case.

The front restraining portions can be arranged laterally on the receptacle and spaced apart from each other, such that the rear wall portion or the case of the warning triangle placed in the receptacle is visible between the two front restraining portions. This improves the visibility of the warning triangle and/or its case, so that it can be found quickly in a breakdown and/or accident situation.

The front restraining portions can have several rib-like projections on their inner receiving surface facing the case of the warning triangle. This improves the clamping effect between the front restraining portions and the clamping element provided in the rear wall portion.

The clamping element can have a latching portion which is engageable or engaged with the case, in particular with an upper edge of the case, when the warning triangle is placed. The clamping element or the clamping elements press(es) the case of the warning triangle towards the front restraining portions and towards the sub-portions of the support portion so that the warning triangle is retained in the receptacle without rattling.

Furthermore, a tailgate for a motor vehicle having a trim element as described above is proposed to attain the stated object.

A motor vehicle may be provided with such a tailgate, wherein the receptacle provided in the trim element is accessible from the inside of the vehicle.

BRIEF DESCRIPTION OF THE FIGURES

Further advantages, features and details of the invention will become apparent from the claims, the following description of preferred embodiments, and referring to the drawings. In the drawings:

DETAILED DESCRIPTION

Figure 1:
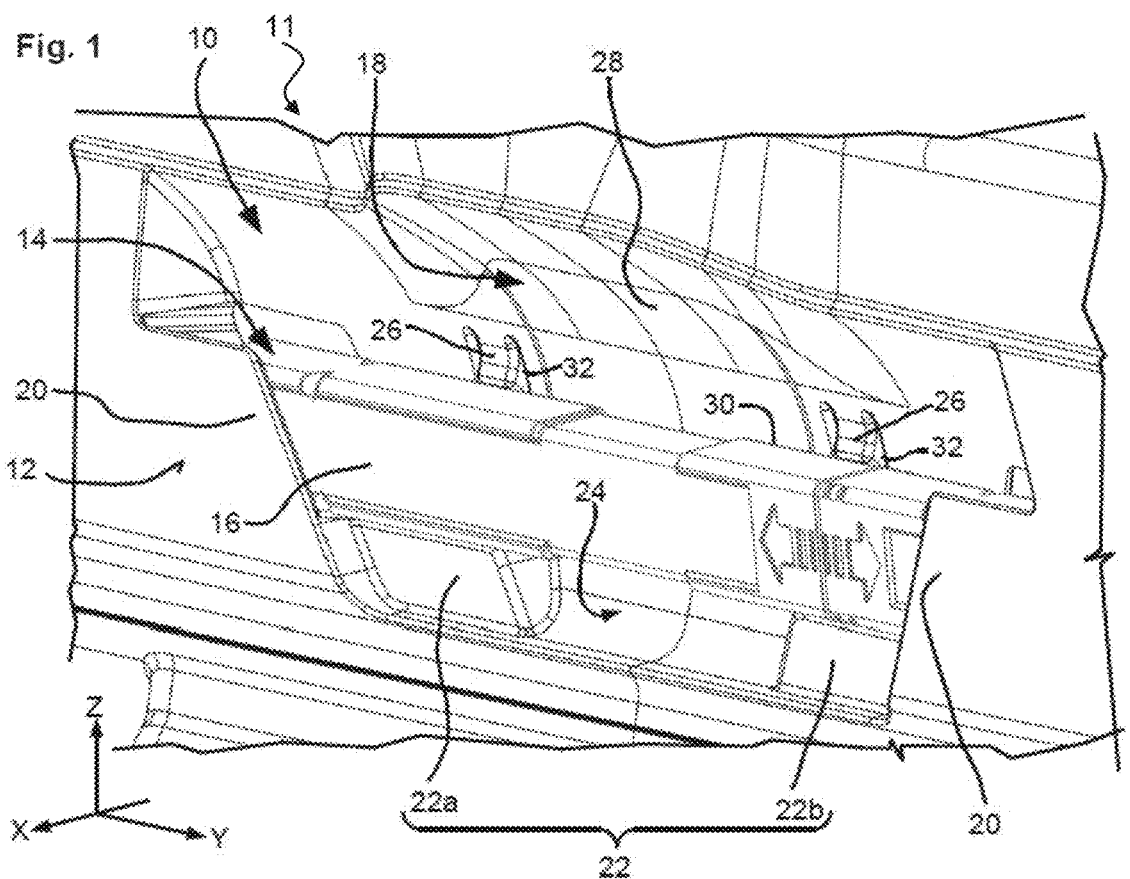
FIG. 1 shows a simplified, schematic perspective representation of a sub-section of a trim element having a receptacle and a warning triangle received therein.
Figure 2:
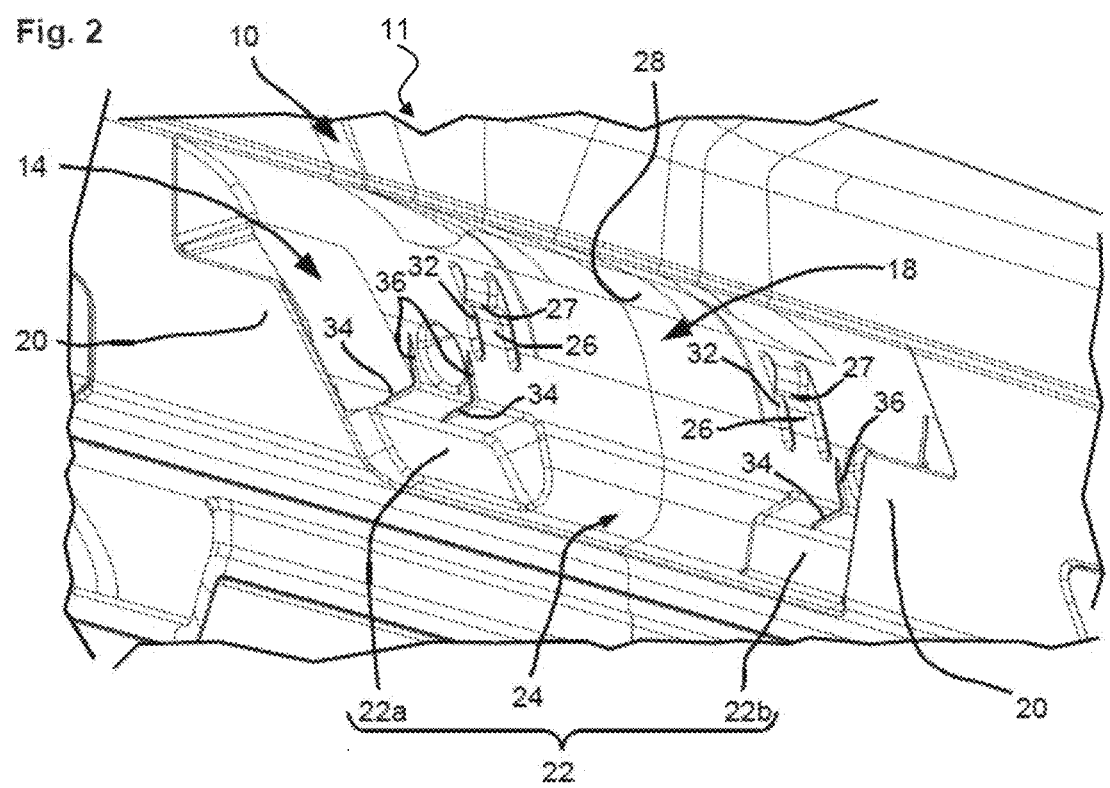
FIG. 2 shows a simplified, schematic perspective representation of the trim element of FIG. 1 having a receptacle without a warning triangle.

FIGS. 1 and 2 show a simplified and schematic perspective representation of a sub-section of a trim element 10 for a tailgate 11 of a motor vehicle. The reference coordinate system shown in FIG. 1 shows a longitudinal direction X, a transverse direction Y and a vertical direction Z, wherein these directions relate in particular to a motor vehicle in which the trim element 10 is installed. In relation to an installed condition in the motor vehicle, FIGS. 1 and 2 show a direction of view directed obliquely backwards to a side 12 of the trim element 10 facing the inside of the vehicle.

A receptacle 14 is provided in the trim element 10. The receptacle 14 is provided for receiving a warning triangle (not visible) placed in a case 16 (FIG. 1). It should be noted that the term warning triangle can also be used hereinbelow to represent the case 16 and can be identified with the same reference numeral.

The receptacle 14 is formed by a rear wall portion 18, two front restraining portions 20, and a support portion 22. In this example, the support portion 22 is divided into two sub-portions 22a, 22b. They are situated on the left and right side, respectively. A gap forming a kind of recessed grip 24 is formed between the two sub-portions 22a, 22b. Relative to an extension of receptacle 14 in the transverse direction Y, the recessed grip 24 is provided approximately centrally.

In the embodiment shown, two clamping elements 26 are provided in the rear wall portion 18. The clamping elements 26 are designed to be elastic so that they can be deformed when the case 16 of the warning triangle is inserted or removed. The rear wall portion 18 has a guide portion 28 above the clamping element 26 which is curved concavely towards the inside of the vehicle. The warning triangle case 16 can be introduced into the received position shown in FIG. 1 along this guide portion 28 or removed from this position along the guide portion 28.

When the case 16 is inserted, the two clamping elements 26 are in contact with an upper rear edge 30 of the case 16. In particular, the clamping elements have a respective latching portion 27 resting against and/or being engaged with the edge 30. This secures the case in the vertical direction Z. Furthermore, the clamping elements 26 apply forward- and/or downward-acting forces so that the case is pressed against the front restraining portions 20 and/or the sub-portions 22a, 22b. Elastic deflection of the clamping elements 26 is achieved in particular by providing transition regions 32 between the clamping elements 26 and the rear wall portion 18. The transition regions 32 have a lower material thickness than the rear wall portion and/or the clamping elements 26 themselves. Accordingly, the clamping elements 26 can be moved and/or deflected forwards and/or backwards relative to the longitudinal direction X by elastic deformation of the transition regions 32. The clamping elements 26 are integrally formed with the rear wall portion 18.

As is furthermore apparent in FIG. 2, rib-like projections 34 can be formed on the sub-portions 22a, 22b on which the case 16 rests. Rib-like projections 36 can also be provided in the rear wall portion 18, in particular in the region of the projections 34 of the sub-portions 22a, 22b. In particular, such rib-like projections 34, 36 serve to improve the clamping effect on the case 16 received in the receptacle 14, while at the same time reducing friction compared to a full-surface contact of the case 16 and, for example, the rear wall portion 18, which in particular facilitates removal of the warning triangle and/or the case 16.

Taking into account both FIGS. 1 and 2, it is also apparent that the front restraining portions 20 are arranged laterally on the receptacle 14 and spaced apart from each other so that the rear wall portion (FIG. 2) or the case 16 (FIG. 1) of the warning triangle placed in the receptacle 14 is visible between the two front restraining portions 20.

Figure 3:
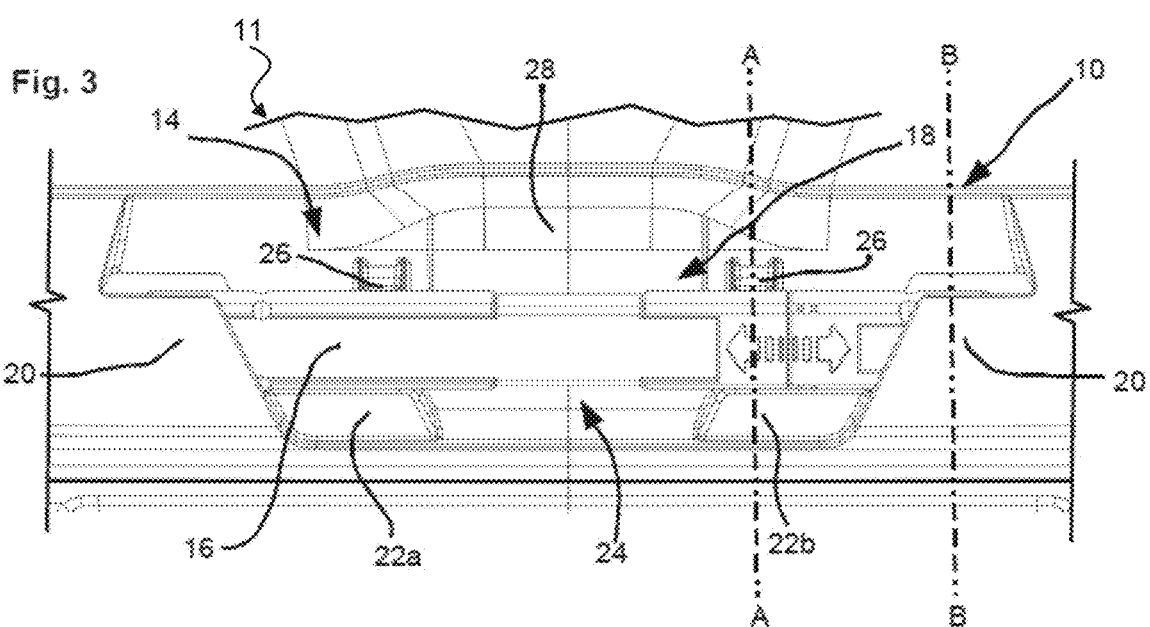
FIG. 3 shows a simplified, schematic top view of a side of the trim element facing the inside of the vehicle having a receptacle and a warning triangle received therein.

FIG. 3 shows a top view of the trim element 10 having the receptacle 14 and the warning triangle case 16 received therein. The viewing direction corresponds to the longitudinal direction X, looking from the inside to a tailgate 11 on which the trim element 10 is attached. Components that have already been described referring to FIGS. 1 and 2 are designated with the same reference numerals in FIG. 3.

Figure 4:
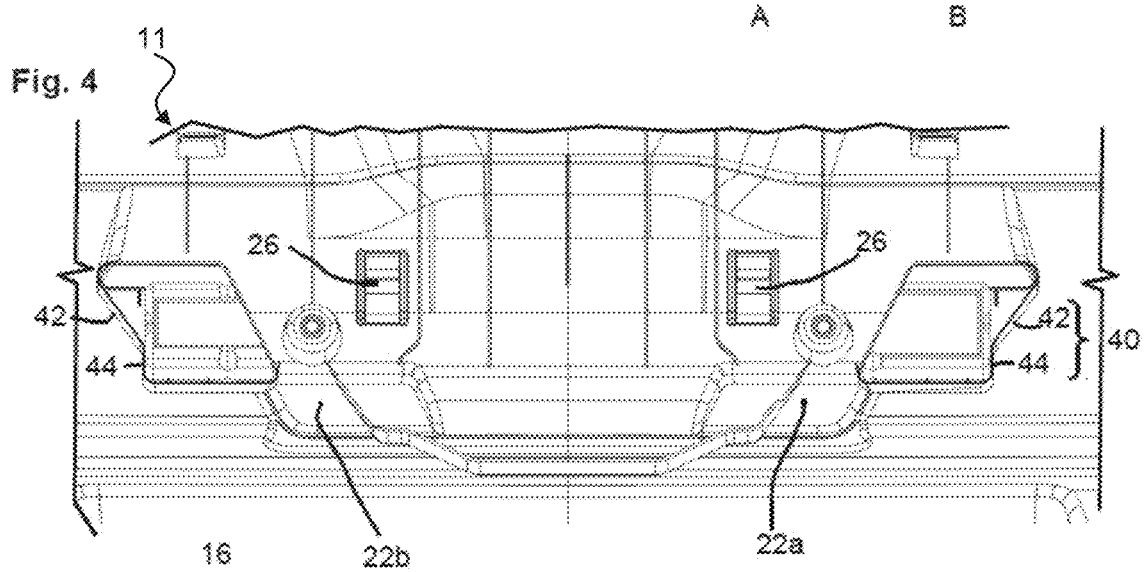
FIG. 4 shows a simplified, schematic top view of a side of the trim element facing away from the inside of the vehicle having a receptacle and a warning triangle received therein.
Figure 5:
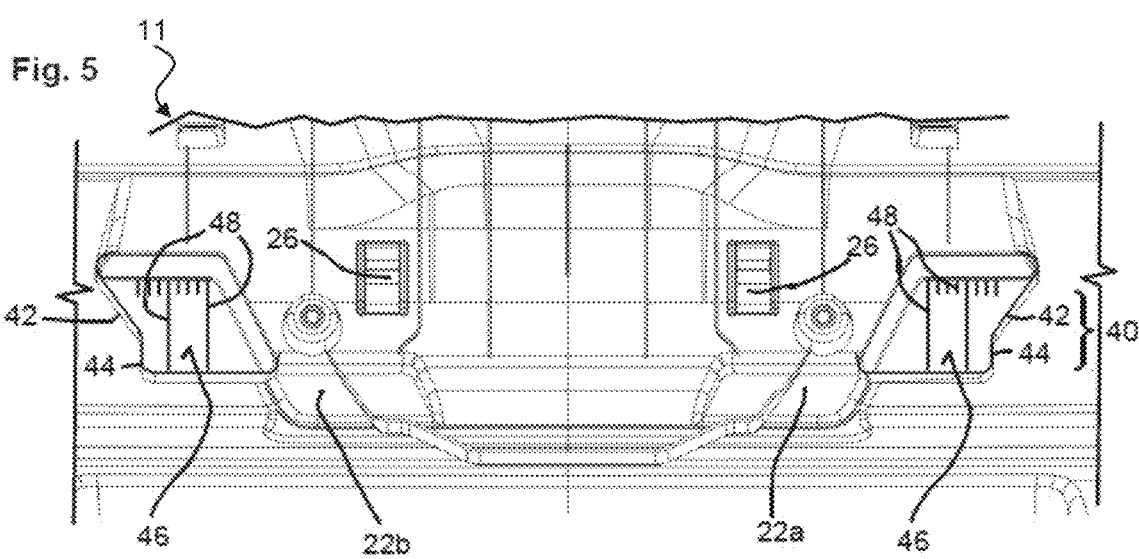
FIG. 5 shows a simplified, schematic top view of the side of the trim element facing away from the vehicle interior having a receptacle without a warning triangle.

FIGS. 4 and 5 show the trim element 10 from its rear side. That means the viewing direction is from the rear onto the trim element 10 that has not (yet) been installed in a tailgate. In FIG. 4, the case 16 of the warning triangle is received in the receptacle 14. FIG. 5 shows the receptacle 14 without a case 16.

The representations in FIGS. 4 and 5 show lateral centering elements 40. The centering elements 40 have a respective introduction portion 42 inclined relative to the vertical direction Z. Furthermore, a respective receiving portion 44 is adjacent to the introduction portion 42 extending essentially vertically and/or parallel to the vertical direction Z. The introduction portions 42 are designed in such a way that they form a V-shaped and/or funnel-like lateral guide for the case 16. Correspondingly, the case 16 is positively centered, particularly when being inserted into the receptacle 14, and subjected to a clamping force and retained between the two receiving portions 44.

It is also apparent in FIG. 5 that rib-like projections 48 can be provided on the sides 46 of the front restraining portions 20 facing the receptacle 14. In other words, the rib-like projections 48 are arranged on the rear side 46 of the restraining portions 20. These rib-like projections 48 also serve to improve the clamping effect on the case 16 received in the receptacle 14. Thus full-surface contact of the case with the restraining portions 20 can be avoided, which has a favorable effect on the forces to be applied when removing the case 16.

Figure 6:
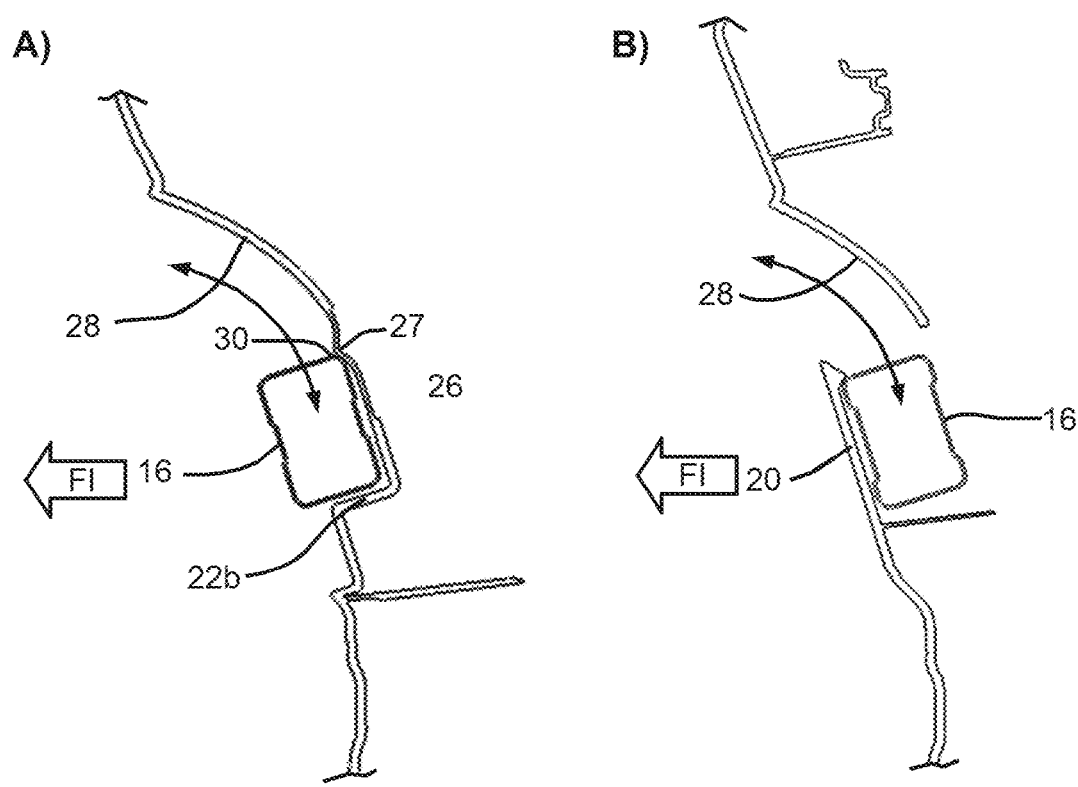
FIG. 6 shows simplified sectional views in sub-figures A) and B) which roughly correspond to the section lines A-A and B-B of FIG. 3.

Sub-figures A) and B) of FIG. 6 show two simplified sectional views corresponding to the section lines A-A and B-B, respectively, of FIG. 3. These representations clearly show the guide portion 28 of the rear wall portion 18 of the trim element 10 which is curved concavely towards the inside of the vehicle (arrow FI). FIG. 6A further shows the clamping force applied to the upper edge 30 of the case 16 by the clamping element 26. Furthermore, the support portion 22 or its sub-portion 22b can also be seen. FIG. 6B shows the front restraining portion 20 against which the case 16 rests. FIGS. 6A and 6B further show a curved double-headed arrow illustrating the guided introduction into or removal from the receptacle 14 of the case 16.

The receptacle 14 provided in the trim element 10 allows the warning triangle to be placed in its case in a tailgate region of a motor vehicle in a safe and visible manner. The configuration of the receptacle 14 with the curved rear wall portion 18 (guide portion 28) and the recessed grip 24 allows for easy removal of the warning triangle in its case 16, in particular with an open tailgate when the trim element 10 and, thus, the case 16 are usually arranged overhead in an essentially horizontal manner. This would roughly correspond to a situation where the representations of FIGS. 6A and 6B are rotated by 90 degrees counterclockwise. When the tailgate is in the open position, the warning triangle can be removed from the receptacle by simply moving an arm down and forwards. Furthermore, the receptacle is designed in such a way that the case 16 of the warning triangle is clearly visible in the receptacle 14 even when stowed, so that the warning triangle can be found quickly even in a state of emergency such as a breakdown or a collision. The configuration of the receptacle 14 also enables the warning triangle to be safely stored in its case 16 without rattling and without any elements or tools having to be actuated or used either to insert the case 16 into or to remove it from the receptacle 14.

Figure 7:
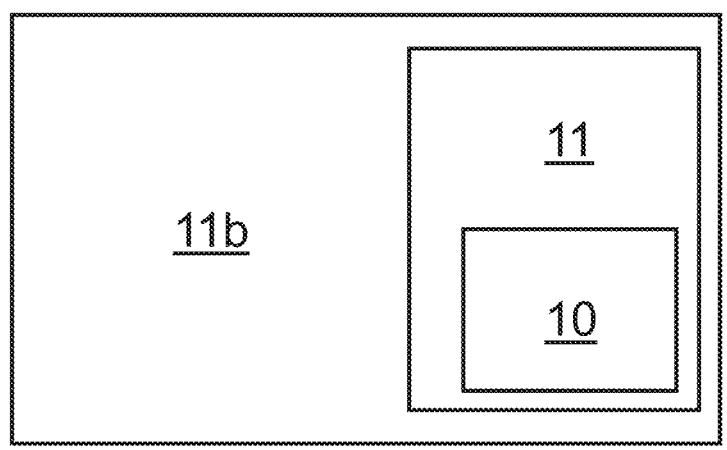
FIG. 7 shows, in schematic form, a motor vehicle with a tailgate having a trim element for containing a warning triangle.

In simplified schematic form, FIG. 7 shows a motor vehicle 11b comprising a tailgate 11 which has a trim element 10 according to any of the foregoing disclosure.

The invention claimed is:

1. A trim element for a tailgate of a motor vehicle, comprising:
   a receptacle formed in the trim element, the receptacle being open towards an inside of the vehicle and configured to receive a warning triangle accommodated in a case,
   wherein the receptacle comprises: a rear wall portion having at least one elastic clamping element; two front restraining portions; and a support portion,
   wherein the clamping element, the front restraining portions and the support portion are configured to engage in a form-fitting and/or force-fitting connection with the case when the warning triangle is arranged in the receptacle,
   wherein the rear wall portion has a guide portion above the clamping element which is curved concavely towards the inside of the vehicle and along which the case is guided into and/or out of the receptacle, and
   wherein the receptacle has two lateral centering elements, each comprising an introduction portion inclined relative to a vertical direction and a receiving portion which adjoins the introduction portion and which extends essentially in the vertical direction.

2. The trim element according to claim 1, wherein the two introduction portions together form a V-shaped or funnel-like guide for the case.

3. The trim element according to claim 1, wherein the support portion comprises two lateral sub-portions spaced apart from each other.

4. The trim element according to claim 3, wherein a distance between the two lateral sub-portions serves as a recessed grip between the two lateral sub-portions.

5. The trim element according to claim 1, wherein the clamping element is integrally formed with the rear wall portion, and
   wherein transition regions with reduced material thickness are arranged between the clamping element and the rear wall portion, such that the clamping element is movable relative to the rear wall portion by deforming the transition portions.

6. The trim element according to claim 1, wherein the receptacle has two clamping elements.

7. The trim element according to claim 4, wherein the receptacle has two clamping elements, and
   wherein each clamping element is arranged above a corresponding one of the two lateral sub-portions.

8. The trim element according to claim 1, wherein the front restraining portions are arranged laterally on the receptacle and spaced apart from each other, such that the rear wall portion or the case of the warning triangle placed in the receptacle is visible between the two front restraining portions.

9. The trim element according to claim 1, wherein a plurality of rib-like projections are formed on at least one of:
   an inner receiving surface of the two front restraining portions which faces the case,
   the rear wall portion, and
   the support portion.

10. The trim element according to claim 1, wherein the clamping element has a latching portion which engages with the case.

11. A tailgate for a motor vehicle comprising the trim element according to claim 1.

12. A motor vehicle comprising the tailgate according to claim 11, wherein the receptacle is accessible from the inside of the vehicle.

13. The trim element according to claim 2, wherein the support portion comprises two lateral sub-portions spaced apart from each other.

14. The trim element according to claim 2, wherein the clamping element is integrally formed with the rear wall portion, and wherein transition regions with reduced material thickness are arranged between the clamping element and the rear wall portion, such that the clamping element is movable relative to the rear wall portion by deforming the transition portions.

15. The trim element according to claim 3, wherein the clamping element is integrally formed with the rear wall portion, and wherein transition regions with reduced material thickness are arranged between the clamping element and the rear wall portion, such that the clamping element is movable relative to the rear wall portion by deforming the transition portions.

16. The trim element according to claim 4, wherein the clamping element is integrally formed with the rear wall portion, and wherein transition regions with reduced material thickness are arranged between the clamping element and the rear wall portion, such that the clamping element is movable relative to the rear wall portion by deforming the transition portions.

* * * * *